US011157494B2

(12) United States Patent
Gerard (10) Patent No.: US 11,157,494 B2
(45) Date of Patent: *Oct. 26, 2021

(54) EVALUATION OF QUERY FOR DATA ITEM HAVING MULTIPLE REPRESENTATIONS IN GRAPH ON A SUB-QUERY BY SUB-QUERY BASIS UNTIL DATA ITEM HAS BEEN RETRIEVED

(71) Applicant: International Business Machines Corporation, Armonk, NY (US)

(72) Inventor: Scott N. Gerard, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 15/278,601

(22) Filed: Sep. 28, 2016

(65) Prior Publication Data

US 2018/0089263 A1    Mar. 29, 2018

(51) Int. Cl.
*G06F 16/30* (2019.01)
*G06F 16/2453* (2019.01)
*G06F 16/901* (2019.01)

(52) U.S. Cl.
CPC .... *G06F 16/24535* (2019.01); *G06F 16/9024* (2019.01)

(58) Field of Classification Search
CPC .................. G06F 16/24535; G06F 16/9024
USPC ........ 707/609, 687, 705, 769, 790, 813, 821
See application file for complete search history.

(56) References Cited

U.S. PATENT DOCUMENTS

| 6,151,595 | A | 11/2000 | Pirolli et al. |
| 7,873,627 | B2 | 1/2011 | Grabs |
| 8,706,653 | B2 | 4/2014 | Kasneci et al. |
| 8,898,159 | B2 | 11/2014 | Brown et al. |
| 2003/0167258 | A1 | 9/2003 | Koo |
| 2008/0281801 | A1* | 11/2008 | Larson ................. G06F 16/284 |
| 2011/0131199 | A1 | 6/2011 | Simon |
| 2011/0258179 | A1 | 10/2011 | Weissman |
| 2012/0005219 | A1* | 1/2012 | Apacible ............... G06F 16/334 707/768 |
| 2012/0054226 | A1* | 3/2012 | Cao ...................... G06F 16/838 707/769 |
| 2012/0066205 | A1 | 3/2012 | Chappell et al. |

(Continued)

OTHER PUBLICATIONS

Oracle Spatial and Graph: RDF Semantic Graph Feature presentation, 2013, 250 pp.

(Continued)

*Primary Examiner* — Sana A Al-Hashemi
(74) *Attorney, Agent, or Firm* — Ewa M. Wozniak (57) ABSTRACT

Sub-queries for a query are ordered. The query is for retrieving a data item of a data graph. The data graph stores representations of the data item. Each representation stores information represented by the data item in a different manner or way. Each sub-query corresponds to a different representation in which the data graph stores the data item. The sub-queries are ordered in an ordered list according to likelihood that evaluation thereof will yield an appropriate or selected representation of the data item that is correct for the query and that correctly answers the query. The sub-queries within the ordered list are evaluated on a sub-query by sub-query basis, until the data item has been retrieved.

20 Claims, 5 Drawing Sheets

(56) References Cited

U.S. PATENT DOCUMENTS

| | | |
|---|---|---|
| 2012/0072456 A1 | 3/2012 | Dube |
| 2013/0246462 A1 | 9/2013 | Bhogal |
| 2013/0257871 A1 | 10/2013 | Goldstein et al. |
| 2014/0153366 A1 | 6/2014 | Nealon et al. |
| 2014/0351281 A1 | 11/2014 | Tunstall-Pedoe |
| 2015/0058412 A1 | 2/2015 | Hillerbrand |
| 2015/0331850 A1* | 11/2015 | Ramish ................ G06F 16/245 704/9 |
| 2016/0147834 A1* | 5/2016 | Lee .................. G06F 16/24542 707/718 |
| 2017/0068748 A1* | 3/2017 | Hu ...................... G06F 16/9024 |
| 2017/0177303 A1* | 6/2017 | Ma ............................ G06F 8/30 |
| 2017/0177664 A1* | 6/2017 | Ma ................... G06F 16/24542 |
| 2017/0177666 A1* | 6/2017 | Ma ................... G06F 16/24544 |
| 2018/0089264 A1 | 3/2018 | Gerard |
| 2018/0089265 A1 | 3/2018 | Gerard |

OTHER PUBLICATIONS

"Reconciliation", online <https://web.archive.org/web/20141030044042/http://wiki.freebase>, Oct. 16, 2012, 3 pp.

IBM: List of IBM Patents or Patent Applications Treated as Related (Appendix P), Sep. 25, 2019, 2 pages.

Pending U.S. Appl. No. 16/568,341, filed Sep. 12, 2019, entitled: "Reusing Sub-Query Evaluation Results in Evaluating Query for Data Item Having Multiple Representations in Graph", 55 pages.

IBM: List of IBM Patents or Patent Applications Treated as Related (Appendix P), Sep. 28, 2016, pp. 1-2.

* cited by examiner

EVALUATION OF QUERY FOR DATA ITEM HAVING MULTIPLE REPRESENTATIONS IN GRAPH ON A SUB-QUERY BY SUB-QUERY BASIS UNTIL DATA ITEM HAS BEEN RETRIEVED

BACKGROUND

Data is commonly stored in computing systems for later retrieval. Such retrieval can be performed by querying a data store for a desired data item that may be stored in the data store. Data may be stored within a computing system as a data graph. A data graph includes a number of nodes, which are connected to one another via edges. Data can be stored within each node, as well as on each edge.

SUMMARY

An example method includes receiving, by a computing device, a query for retrieving a data item of a data graph. The data graph stores representations of the data item. Each representation of the data item stores knowledge represented by the data item in a different manner. The method includes determining, by the computing device, sub-queries for the query. Each sub-query corresponds to a different representation by which the data graph stores the data item. The method includes ordering, by the computing device, the sub-queries for the query according to likelihoods that evaluation of the sub-queries will yield an appropriate representation of the data item for the query. The method includes evaluating, by the computing device, the sub-queries as ordered on a sub-query by sub-query basis, until the data item has been retrieved.

An example computer program product includes a computer-readable storage medium having program instructions embodied therewith. The computer-readable storage medium is not a transitory signal per se. The program instructions are executed by a computing device to order sub-queries for a query. The query is for retrieving a data item of a data graph. The data graph stores representations of the data item. Each representation stores information represented by the data item in a different way. Each sub-query corresponds to a different representation in which the data graph stores the data item. The sub-queries are ordered in an ordered list according to likelihood that evaluation thereof will yield a selected representation of the data item that is correct for the query. The program instructions are executed by the computing device to evaluate the sub-queries within the ordered list on a sub-query by sub-query basis, until the data item has been retrieved.

An example system includes network hardware to communicatively connect to a network over which a query for retrieving a data item of a data graph is received. The system includes a storage device to store the data graph. The data graph includes representations of the data item. Each representation represents the data item in a different way. The example system includes logic having hardware. The logic is to order sub-queries for the query in an ordered list according to how likely evaluation thereof yields a selected representation of the data item that correctly answers the query. The logic is to evaluate the sub-queries within the ordered list on a sub-query by sub-query basis, until the data item has been retrieved or until all the sub-queries have been evaluated and the data item has not been retrieved.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

As noted in the background section, a computing system can store retrievable data as a data graph including nodes that are interconnected to one another by edges. Traditionally, data has been stored canonically. This means that for any piece of information, there is a single, unambiguous manner by which the information is canonically represented within a data graph. Before new data is added to the data graph, the data is "cleaned" to ensure that any ambiguity in the information or knowledge to which the data corresponds is removed.

However, more recently data has begun to be stored cognitively to better reflect the ambiguous nature of information. This means that for a piece of information, there can be multiple ways in which the information can be represented within a data graph. Each representation of the data may convey the information in a different way, and no particular way may be considered the "right" or "correct" way in an absolute sense. Data can be added to the data graph without having to remove any ambiguity in the information or knowledge to which the data corresponds.

As one example, a person's date of birth is not necessarily devoid of ambiguity. A woman may enter a hospital to give birth on December 30, begin labor on December 31, and give birth on January 1 to a child. While January 1 may be commonly considered the date of birth of the child, in other circumstances December 30 or December 31 may be considered the birth date. The hospital may track birth dates by when expectant mothers enter the hospital, in which case December 30 is the birth date. Certain inheritance and tax methodologies may permit December 31 to be listed as the birth date. Therefore, there is ambiguity within the birth date. Neither December 30, December 31, nor January 1 is the "wrong" birth date in an absolute sense. Rather, each of these dates is the "right" birth date depending on the context in question.

Storing multiple representations of a data item is thus useful in a cognitive sense, because different representations of the data item may be appropriate for different contexts, and therefore for satisfying different queries for the same data item. A query requesting a person's birth date for tax or inheritance purposes may solicit a different representation of the same data item as compared to a query requesting the same person's birth for more conventional purposes. Reflecting the ambiguous nature of information by storing multiple representations of a data item permits fulfillment of cognitively diverse queries for the same data item but that may be soliciting different representations of the item.

Disclosed herein are techniques for evaluating a query for a data item that has multiple representations in a data graph.

Multiple sub-queries for the query are determined, where each sub-query corresponds to a different representation by which the data graph stores the data. Each representation of the data item within the data graph corresponds to a different way or manner by which the knowledge or information represented by the data item is stored. The sub-queries for the query are ordered according to the likelihood that their evaluation will yield the appropriate representation of the data item for the query in question. The sub-queries are evaluated on a sub-query by sub-query basis, until the data item has been retrieved.

Such techniques can provide for the quickest retrieval of a representation of a data item in apparent fulfillment of the query. Although the data item may not be the "best" answer to the query, the likelihood that it is the most appropriate representation is high, because the sub-queries are ordered according to the likelihood that their evaluation will yield the appropriate representation of the data item for the query. Once the data item has been retrieved, in other words, no other sub-queries are evaluated to determine if there is potentially a better or more appropriate representation of the data item. That is, once the data item has been retrieved, any other sub-queries that have not yet been evaluated are not evaluated.

Figure 1:
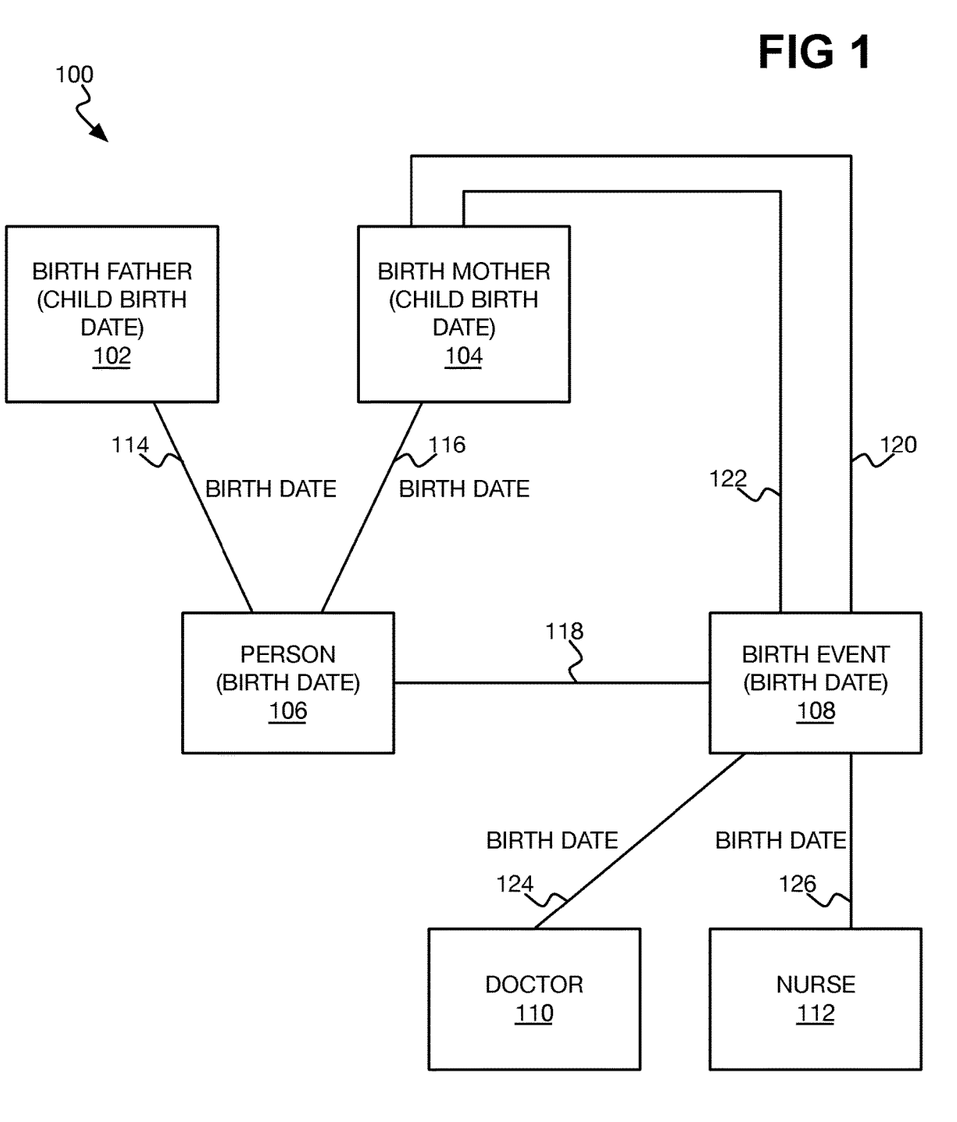
FIG. 1 is a diagram of an example data graph.

FIG. 1 shows an example data graph 100 that cognitively stores information over nodes 102, 104, 106, 108, 110, and 112 that are interconnected to one another by edges 114, 116, 118, 120, 122, 124, and 126. The data graph 100 cognitively stores information in that the graph 100 stores multiple representations of a data item, such as the birth date of the person identified by the node 106, which each store a different cognition of this knowledge that the data item represents in a different way or manner. In the example of FIG. 1, the edges 114, 116, 118, 120, 124, and 126 are non-directional, but in another implementation, one or more edges interconnecting nodes like the nodes 102, 104, 106, 108, 110, and 112 can be directional. A directional edge connects a source or "from" node to a destination or "to" node, and the direction of the edge can itself indicate information.

The nodes 102 and 104 correspond to the birth father and the birth mother, respectively, of the person of the node 106. Each of the nodes 102 and 104 may store the birth date of the person of the node 106. The node 102 may store Dec. 31, 1964 as the date of the person of the node 106, whereas the node 104 may store Jan. 1, 1965. Dec. 31, 1964, may be the date of the person for tax purposes, whereas Jan. 1, 1965 may be the medical date of birth of the person. The node 106 may store Jan. 1, 1965, which is the date that the person of the node 106 identifies as his or her birth date.

The edges 114 and 116 connect the node 102 and 104, respectively, to the node 106. Each of the edges 114 and 116 may also store the birth date of the person of the node 106. The edge 114 may store Dec. 31, 1964 as the date of the person of the node 106, for inheritance purposes. The edge 116 may store Jan. 2, 1964 as the date of the person of the node 106, as the date when the birth mother left the hospital after giving birth.

The node 108 is an event node that corresponds to the birth event of the person of the node 106. The node 108 is therefore connected to the node 106 by an edge 118. The nodes 102 and 104 of the birth father and the birth mother are likewise connected to the node 108 by edges 120 and 122, respectively. The edges 118, 120, and 122 may not contain any information regarding the birth date of the person of the node 106. The node 108 may store Jan. 1, 1965, which is the date of the actual birth of the person of the node 106 as recorded at the hospital.

The node 110 corresponds to the doctor that performed delivery of the person of the node 106 at the hospital, and the node 112 corresponds to the attending nurse that assist the delivery of the person of the node 106 at the hospital. The nodes 110 and 112 are thus connected to the node 108 by edges 124 and 126, respectively. The edge 124 may store Dec. 31, 1964 as the date of the person of the node 106, as the date when the doctor was first called to the delivery room to perform the delivery. The edge 126 may store Dec. 30, 1964 as the date of the person of the node 106, as the date when the nurse was first called to the delivery room to assist the delivery upon admission of the of the birth mother to the hospital.

Therefore, within the data graph 100, the birth date of the person of the node 106 is differently listed as Dec. 30, 1964, Dec. 31, 1964, Jan. 1, 1965, and Jan. 2, 1964. None of these dates may be cognitively incorrect or wrong, but rather each date may represent a different cognitive understanding of what birth date is, for different purposes, including legal, tax, cultural, medical, and administrative purposes. Each node and each edge that stores the birth date of the person of the node 106 may provide contextual or cognitive information as to why or how it considers the birth date of the person of the node 106 to be the date that has stored, such as for legal, tax, cultural, medical, or administrative purposes. However, this is not necessarily the case.

The data graph 100 may have been constructed by adding information from different data stores. For example, records from a tax database may be imported, as well as records from a hospital database, an ancestral research database, a credit reporting database, and so on. When adding data to the data graph 100, via construction of new nodes or edges, the information or knowledge that the data represents is not "cleaned" or scanned to ensure that programmatically the same information is represented in the same canonical manner. That is, what one data source considers an individual's birth date as compared to what a different data source considers as an individual's birth date is not considered when adding information to the graph 100. Rather, the data may simply be added, resulting in the situation described above, in which the birth date of the person of the node 106 is not identical across different nodes and edges of the graph 100.

The data graph 100 may be a union of one or more other graphs, which may themselves be programmatic or cognitive. The union of two graphs that each store data canonically in a single canonical manner may result in a constructed graph that stores data cognitively in diverse manners if the canonical manner of one source graph is different than that of the other source graph. For example, a data graph storing birth date as the date of birth as conventionally or by custom understood in Western countries that is joined to a data graph that stores birth date by date of hospital admission for medical billing purposes results in a combined data graph that stores birth date in two different ways, underscoring that birth date may cognitively differ.

Furthermore, a given node or edge of the data graph 100 may store incorrect information for a particular data item. For example, an error in data entry may result in the birth date of the person of the node 106 being incorrect in one of the nodes or along one of the edges of the graph 100. When the data in question is added to the graph 100, there may not be a verification or check to ensure that the data is accurate for the way in which the data represents the birth date of the person of the node 106. The acknowledgment that the information represented by the graph 100 may not necessarily be 100% accurate, too, can underscore the cognitive nature of the knowledge of the graph 100, in that stored knowledge may not be accurate.

However, to the extent that the data graph 100 accurately stores multiple representations of the birth date of the person of the node 106 that differ from one another, no individual representation may be considered correct or right in an absolute sense. That the date of birth of the person of the node 106 may be different among different nodes and edges of the graph 100 does not mean that any specific date listed for this birth date is necessarily wrong. Rather, that the birth dates differ just signifies that for different purposes, for instance, the birth date of the person of the node 106 can vary.

The data graph 100 depicted in FIG. 1 is an example of a portion of a graph. A graph like the graph 100 of FIG. 1 that stores information concerning birth dates, among other knowledge, will usually include hundreds, thousands, or even millions of nodes and edges. Just six nodes and seven edges are depicted in FIG. 1 as an example of a data graph 100 that stores multiples representations of a data item—the birth date of the person of the node 106.

Furthermore, other data graphs can store information other than birth dates. The information can concern people, or may not concern people. Other information that may concern people include other types of medical, tax, legal, and birth information. Information that may not concern people can include information regarding events, places, or things. That is, the data graph 100 is just an example, and does not represent the sole type of data graph to which the techniques disclosed herein can be applied to retrieve data items from such a data graph that can store multiple representations of each data item as a cognitive approach to data storage.

Figure 2:
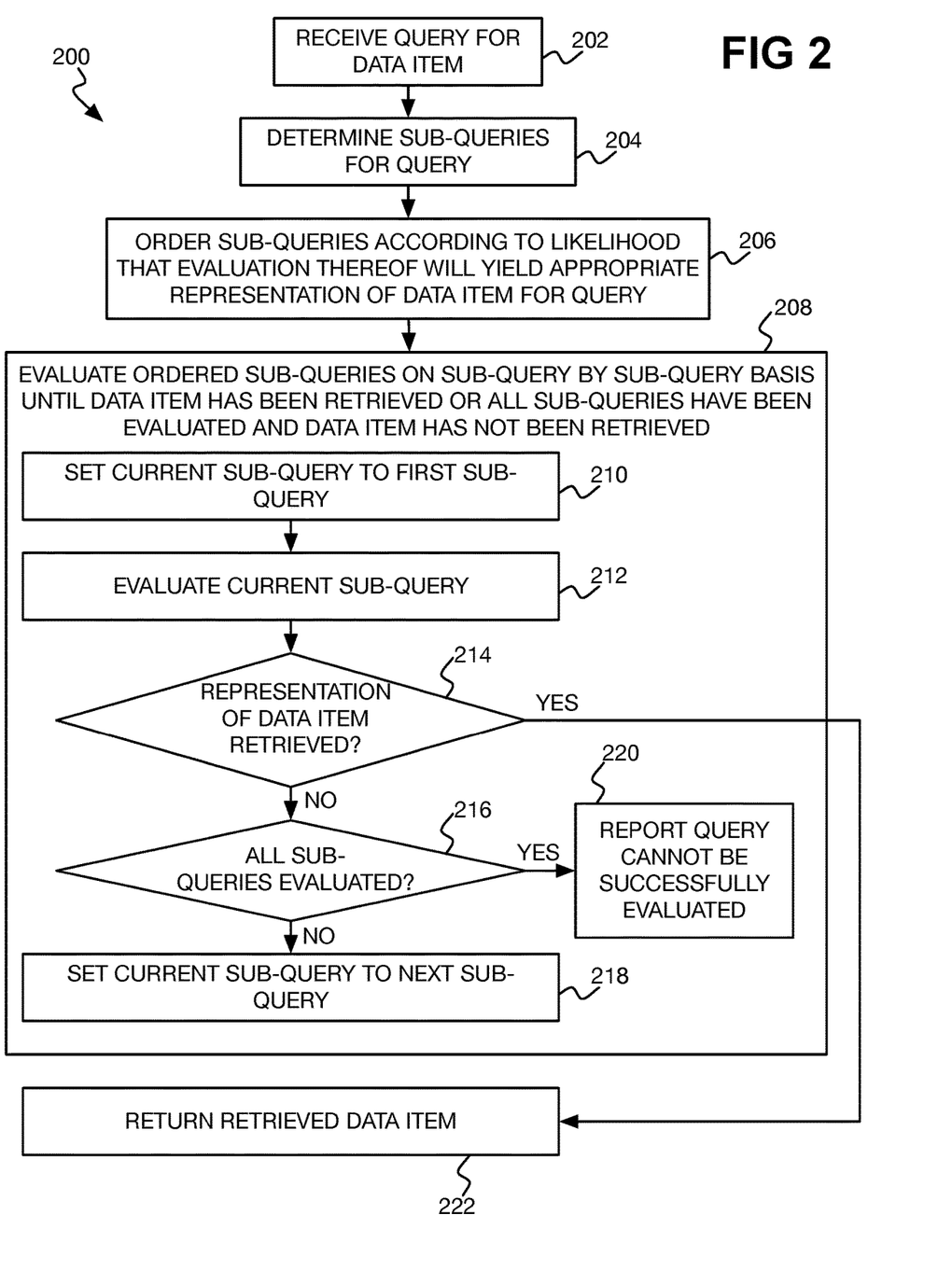
FIG. 2 is a flowchart of an example method for evaluating a query against a data graph storing multiple representations of a data item.

FIG. 2 shows an example method 200 for evaluating a query against a data graph, like the graph 100 of FIG. 1, which stores multiple representations of a data item. As noted, for a given data item having multiple representations, each representation stores knowledge or information of the data item in a different manner. That is, each representation represents the same underlying data item, but represents a different cognitive manner or way of considering the knowledge or information that the data item conveys or "is."

The method 200 is performed by a computing device that includes or that is communicatively connected to a storage device or system storing the data graph. The data graph may include terabytes, petabytes, or more of data, and as such, the storage system can be or include a multiple-storage device system such as a storage-area network (SAN). The computing device may be a server computing device, which is communicatively connected to a network to interact with the storage system, as well as with client computing devices, such as desktop or laptop computers as well as mobile computing devices like smartphones and tablet computing devices, which submit queries and to which data items responsive to the queries are returned.

The computing device thus receives a query for a data item (202). The query may be received from a client computing device. The query may be received over a network to which the computing device performing the method 200 and the client computing device are communicatively connected.

The query may be formatted in a natural language manner, such as "what is the birth date of John Smith for tax purposes"; "give me John Smith's date of birth"; "when was John Smith born"; and so on. Natural language processing therefore can be performed on the query to determine the data item of the query. In the examples, the data item in question is the birth date of John Smith, and may indicate the data item with more granularity or precision to the extent that the query includes such information, or to the extent that metadata surrounding the query can provide this information. For instance, if the query specifies, "what should I list as John Smith's birth date on his dad's will," then the natural language processing may discern that the birth date being requested is that for inheritance purposes. As another example, if the query is received from a nurse at a hospital, then the processing may discern that the birth date being requested is the date when the nurse began attending to the expectant mother upon her admission to the hospital at which the nurse was working.

The query can also be specified in a more particular manner. The different data items that a data graph stores can be known. Furthermore, the multiple representations of each data item can be known. Therefore, a query may be specified by selecting a type of data item, such as birth date, and then by selecting a particular representation of the this birth date, such as "customary," "for tax purposes," "for inheritance purposes," and so on. The query thus specifies the desired person for whom this data item is being requested, like "John Smith," as well as the particular representation of the data item that is desired. This specification of the query is more precise than a natural language specification of the query, but may be less intuitive for users, particularly less computer-savvy users.

The computing device determines sub-queries for the received query (204). Two specific implementations for determining the sub-queries for a query are described later in the detailed description. In general, each sub-query corresponds to a representation of the data item within the data graph. For instance, as to the birth date of a person within the data graph 100 of FIG. 1, such as the person of the node 106, there may be a sub-query corresponding to each of the nodes 102, 104, 106, and 108, as well as a sub-query corresponding to each of the edges 114, 116, 124, and 126, for a total of eight sub-queries. This is because each node 102, 104, 106, and 108 and each edge 114, 116, 124, and 126 stores the birth date of a person, particularly the person of the node 106.

Even though multiple node(s) or multiple edge(s) may store the same underlying understanding of the data item, each such node or edge can still have a different sub-query because it still corresponds to a different representation of the data item. For example, the birth date of the person as stored in the node 106 may reflect the same underlying understanding of what birth date means as that stored in the node 108. However, the representation of the birth date of the person as stored in the node 106 is still different than that stored in the node 108. Therefore, there can be a sub-query to retrieve the birth date of the person as stored in the node 106, and another sub-query to retrieve the birth date of the person as stored in the node 108.

The computing device orders the sub-queries according to the likelihood that their evaluation will yield the appropriate representation of the data item for the query (206). That is, the sub-queries are ordered according to the likelihood that their evaluation will yield a selected representation of the data item that is correct for or appropriate to the query, and thus correctly answers the query insofar as the information contained in this representation is accurate. Two specific implementations for ordering the sub-queries are described later in the detailed description. The sub-queries can be ordered in a list, from a first sub-query that has the highest likelihood of yielding the appropriate representation of the data item to a last sub-query that has the lowest likelihood of yielding the appropriate representation of the data item. These likelihoods can be determined as part of the ordering process of part 206.

In general, each sub-query has a likelihood as to whether its evaluation will yield an appropriate representation of the data item in satisfaction or fulfillment of the query. For example, if the query requests the birth date of the person of the node 106 of the data graph 100 of FIG. 1 as birth date is culturally commonly understood in Western societies, the likelihood that the representation of the data item as stored within the nodes 106 and 108 is the appropriate representation to return is high. By comparison, the likelihood that the representations of the birth date as stored on edges 124 and 126 is the appropriate representation for this query is low. The likelihood as to whether evaluation of a sub-query is appropriate for the query thus is dependent on the query itself. A sub-query that retrieves the birth date of the person for tax or inheritance purposes is unlikely to be the appropriate representation of the data item for a query requesting the birth date as commonly and culturally understood. By comparison, such a sub-query is likely to be the appropriate representation of the data item for a query that is requesting the birth date for trust and estate purposes.

The computing devices evaluates the ordered sub-queries, on a sub-query by sub-query basis, until the requested data item has been retrieved (that is, until a representation thereof has been retrieved), or until all sub-queries have been evaluated and the data item has not been retrieved (that is, no representation thereof has been retrieved) (208). In the example data graph 100 of FIG. 1, the nodes 102, 104, 106, and 108 and the edges 114, 116, 124, and 126 can store the birth date of the person of the node 106. However, this information may be missing from one or more of the nodes, and/or from one or more of the edges. The information may be missing because a data source added to the data graph 100 did not include the information, or for another reason. Therefore, the computing device attempts to retrieve the representation of the data item that has the highest likelihood of being the knowledge sought in the query (via evaluation of the sub-query corresponding thereto), but there is no guarantee that this representation—or indeed any representation—is actually available within the graph 100.

In one implementation, the computing device evaluates the ordered sub-queries in part 208 as follows. The computing device sets what is referred to as a current sub-query to the first sub-query of the ordered list of sub-queries (210). The computing device evaluates the current sub-query to attempt to retrieve the representation of the data item to which the current sub-query corresponds (212). For instance, the computing device may enter the data graph 100 from an entry point, and traverse the graph 100, as the sub-query may dictate, until the node or edge that may have this representation has been reached. Once the computing device reaches the node or edge in question, the device determines whether the information sought is present. If the information is present, then this representation of the data item is retrieved.

As a concrete example, the data graph 100 may be entered for traversal purposes at the node 106. The sub-query being evaluated may correspond to the data representation regarding when the doctor that delivered the person of the node 106 was first called to the delivery room, which would be stored in the edge 124. That is, the sub-query corresponds to the data representation of the birth date of the edge 124. The sub-query may include the path from the node 106 to the edge 124, such as the path including the edge 118 and the node 108. Therefore, the evaluation process includes traversing the data graph 100 from the node 106 to the edge 124 along the prescribed path.

The sub-query, however, may not include this path, and may just specify the edge 124 in question. Therefore, the evaluation process may include traversing outward from all edges 114, 116, and 118 of the person 106, or from selected edges that are more likely to quickly reach the edge 124, until the edge 124 has been reached. This latter evaluation process is likely more processing and time intensive than one that is particularly prescribed in the sub-query itself, but can be advantageous if an exact prescription of the traversal route cannot be determined or is unavailable a priori for inclusion within the sub-query.

If evaluation of the current sub-query resulted in retrieval of the representation of the data item (214), then the computing device stops and returns the retrieved data item (222). The computing device can provide with the retrieve data item the likelihood that the information being provided is the correct answer for the query. That is, the computing device can return the likelihood associated with the sub-query in the ordered list. Such a likelihood can give the user of the client computing device that entered the query a varying degree of confidence as to whether the information is correct. For example, if the query requested the birth date of the person of the node 106 for inheritance purposes, but the only birth date available for the person in question within the data graph 100 is when the nurse of the node 112 began attending to the expectant mother, the likelihood that the information provided is the requested birth date is lower than if the birth date were available on the edge 114.

If the evaluation of the current sub-query does not result in retrieval of the representation of the data item (214)—for instance, if the representation is located on an edge or node that is not present or if the information is not stored in this edge or node—but if there are other sub-queries that still have not been evaluated (216), then the computing device advances the current sub-query to the next sub-query within the ordered list (218) and repeats the method 200 at part 212. If the computing device has evaluated all the sub-queries within the ordered list (216), though, without locating any representation of the data item then the device reports that the query cannot be successfully evaluated against the data graph (220). For instance, the computing device may return to the client computing device from which the query was received that the information requested is unavailable or unknown.

The process of the method 200 thus focuses on quickly returning a representation of a data item for the query. Once a sub-query is evaluated that results in retrieval of the representation of the data item, this representation is returned as responsive to the query without evaluating any further sub-queries. Therefore, in many if not most cases, not all sub-queries within the ordered list may be evaluated. Correctness is provided insofar as the sub-queries are evaluated in the order of their likelihood of returning the appropriate representation of the data item for the query in question. The method 200 is thus advantageous for data graphs that are difficult to evaluate sub-queries against, either because of the manner in which they are stored, the hardware of the storage system storing the graphs having low performance, or the computing device performing the method 200 being responsible for the evaluating many queries and thus being overburdened. The method 200, in other words, is a high performance approach for retrieving a data item responsive to a query, which prioritizes performance over obtaining the absolute best possible answer that a data graph can provide for the query.

Figure 3:
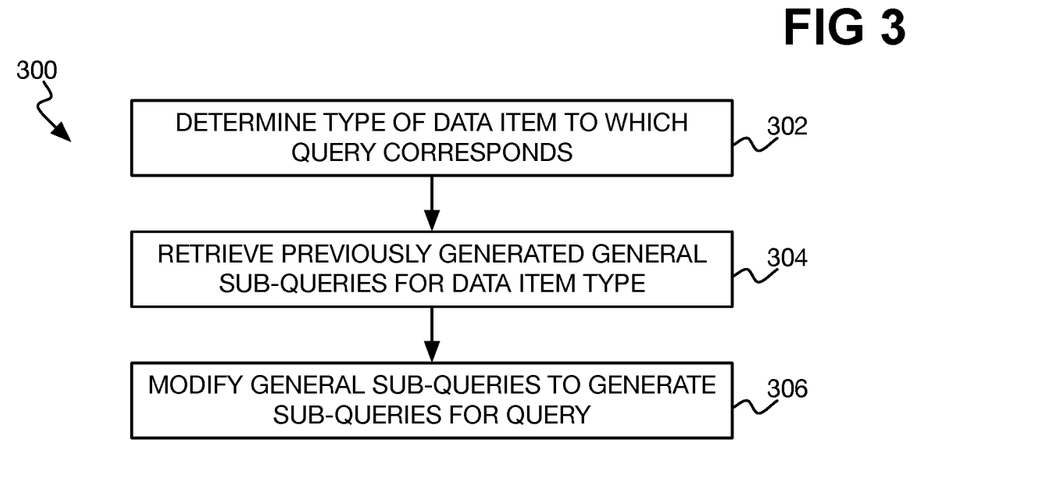
FIGS. 3 and 4 are flowcharts of different example methods for determining sub-queries for a query, which can be used as part of the method of FIG. 2.

FIG. 3 shows an example method 300 that provides one approach for determining the sub-queries for a query. The method 300 can implement part 204 of the method 200. As such, the computing device performing the method 200 can perform the method 300.

The computing device determines the type of data item to which a query corresponds (302). A data graph stores multiple representations of data items. For example, a data item can be the birth date of the person of the node 106 of the data graph 100 of FIG. 1. The birth date of this person is the data item, and the type of this data item is birth date. The birth dates of people of other nodes of the graph 100 have the same data type. That is, a data item can be considered a particular instance of a data type. Stated another way, a birth date is a type, whereas the birth date of a particular person is a data item of this type. Furthermore, the birth date has multiple representations within a data graph.

Determining the type of the data item to which the query corresponds can be achieved from the data item of the query. As noted above in relation to part 202 of the method 200, the data item of a query is determined. If a query is a natural language query, then natural language processing occurs to identify the data item of the query. The data item type can thus be determined from the data item type. For example, if natural language processing concludes that the query is for the data item "John Smith's birth date," then the data item type is simply "birth date." That is, the data item type is determinable from the data item of a query. By comparison, a query can be constructed by selecting a data item type, such as birth date, along with identifying information of the person for whom a date item of this type is desired, such as "John Smith," then the query itself identifies the data item, as well as the data item type of the query.

The computing device retrieves general sub-queries that have been previously generated for the type of the data item to which the query corresponds (304). When a data graph is created or augmented, each time a new representation of a data item is added to the graph, a corresponding general sub-query can be manually or automatically generated for the representation if no such sub-query has previously been created for a data item of the same type. For example, as to the data graph 100, the first time a node corresponding to a birth event, like the node 108, is added, which corresponds to a new representation of a birth date data item, a corresponding general sub-query can be manually or automatically generated. As another example, the first time an edge corresponding to when a doctor was called to perform delivery, like the edge 124, is added, which also corresponds to a new representation of a birth date data item, a corresponding general sub-query can be generated.

A general sub-query can identify the type of node or edge in which a corresponding representation of a data item may be located, without specifying a particular node or edge. For example, a general sub-query can specify a node for a birth event, via node type for instance, without particularly identifying the node 108. As another example, a general sub-query can specify an edge between a node of a doctor and a birth event node, via edge type for instance, without particularly identifying the node 124.

A general sub-query may further provide traversal information as to how to reach the type of node or edge in question from an entry node within a data graph. For example, if a node corresponding to a person, such as the node 106, is an entry node within a data graph, then traversal information for a birth event node may specify that the birth event node is located on a edge directly connected to the node of the person. Traversal information for an edge specifying the birth date as the date when a doctor was called to perform delivery may specify that, from the node of a person, traversal first occurs to a birth event node of that person, and then to the edge connecting the birth event node to the node of a doctor.

For each general sub-query that has been retrieved, the computing device modifies the general sub-query to generate a corresponding sub-query for the specific query in question (306). That is, each general sub-query can be modified so that it is specific to the actual data item sought in the query. For example, the query may be for a birth date data item of the person of the node 106. The general sub-query for a birth event node does not particularly specify the person of the node 106. Therefore, modifying the general sub-query so that it pertains to the person of the node 106 may include identifying the name of the person of the query. As such, the general sub-query is now specific to the query, because it identifies the name of the person for whom a data item—specifically birth date—is being sought in the query.

The method 300 thus retrieves previously generated (general) sub-queries for a query. Generating the sub-queries ahead of time can be advantageous to ensure for optimal performance in processing queries, since sub-queries do not have to be generated after a query is received. However, for data graphs that have a large number of representations of a large number of data items, performing such preprocessing to generate sub-queries prior to query receipt may be undesirable. For instance, it may not be known if certain representations or certain data items may be the subject of queries, in which case generating sub-queries ahead of time may represent unnecessary processing.

Figure 4:
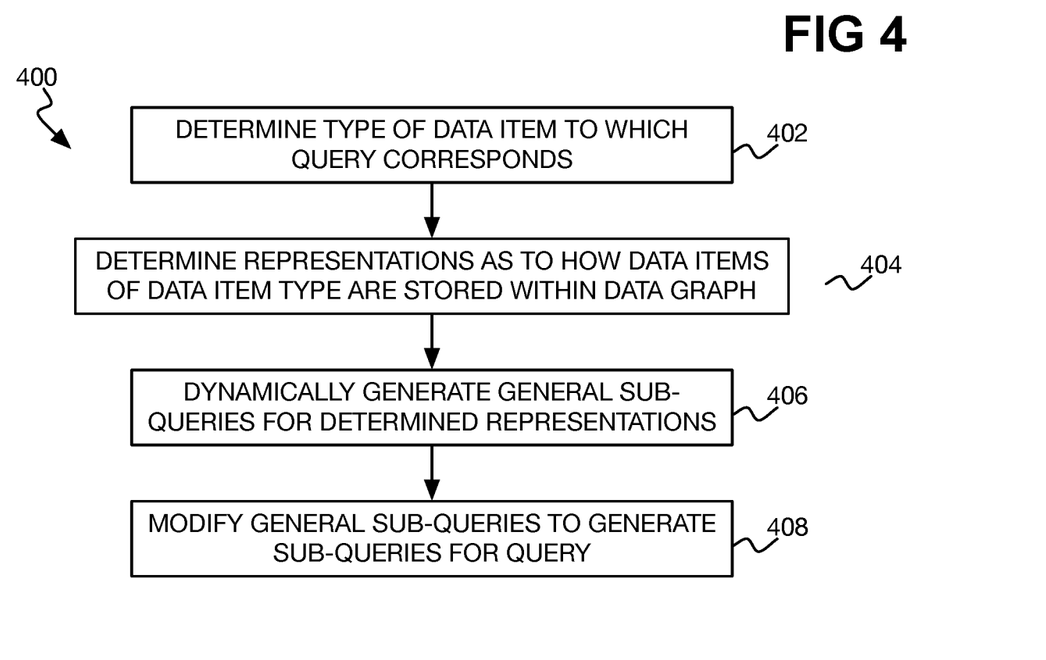

FIG. 4 shows an example method 400 that provides another approach for determining the sub-queries for a query. Like the method 300, the method 400 can implement part 204 of the method 200. The computing device performing the method 200 can thus perform the method 400.

The computing device determines the type of data item to which a query corresponds (402), as in part 302 of the method 300. The computing device further determines the representations as to how data items of this type are stored within the data graph in question (404). The different representations by which a data graph stores the knowledge or information of a data item can be recorded when a data graph is created, or when a data graph is subsequently augmented with new data.

For instance, a data graph may first be generated just with information of data including birth father and birth mother of each of a number of people, including associated birth date information. In the example of FIG. 1, this includes the information of the nodes 102, 104, and 106, and the information of the edges 114 and 116. As to the birth date of a person, such as that of the person of the node 106, there are four representations of this data item. Therefore, when the node 106 is instantiated, the representation of the birth date of the person of the node 106 is recorded, and likewise when the nodes 102 and 104, and the edges 114 and 116, are instantiated.

Continuing the example, the data graph 100 of FIG. 1 may subsequently be augmented with a data source from a hospital, which includes the information of the nodes 108, 110, and 112, and the information of the edges 124, 126, and 128. As to the birth date of a person, such as again that of the person of the node 106, there are three additional representations of this data item. Therefore, when the nodes 108, 110, and 112 are instantiated, the representations of the birth date of the person of the node 106, and likewise when the edges 124 and 126 are instantiated.

The computing device then dynamically generates the general sub-queries for the determined representations of the data item of the query (406). This process is similar to that described in relation to part 304 of the method 300, but occurs after a query has been received, as opposed to when a data graph is created or augmented. The computing device finally modifies the general sub-queries to generate the specific sub-queries for the query that has been received (408), as described above in relation to part 306 of the method 300.

The method 400 may be performed in lieu of the method 300 if performance of adding data to a data graph is prioritized over performance of query evaluation, since the method 400 generates the general sub-queries at the backend (after a query is received) instead of at the frontend (when a graph is created or augmented). The method 400 may be performed in lieu of the method 300 if there are data item representations that are unlikely to be the subject of queries, in which case generating the sub-queries at the time of graph creation or augmentation may represent unnecessary processing. Furthermore, the methods 300 and 400 can be performed in the context of the same data graph, in which some data items have representations for which general sub-queries have been created, and other data items do not.

Figure 5:
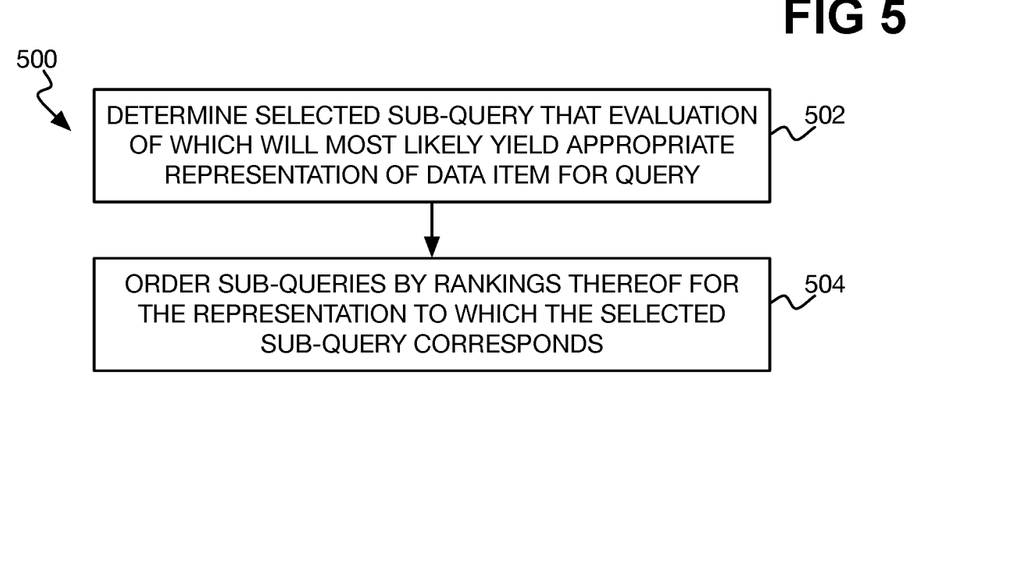
FIGS. 5 and 6 are flowcharts of different example methods for ordering sub-queries for a query, which can be used as part of the method of FIG. 2.

FIG. 5 shows an example method 500 that provides one approach for ordering the sub-queries for a query. The method 500 can implement part 206 of the method 200. As such, the computing device performing the method 200 can perform the method 500.

In general, a sub-query can be considered as having rankings for the different representations of the data item to which the sub-query corresponds. A sub-query elicits a particular representation of a data item. However, the particular representation to which the sub-query corresponds may be more likely to also be the same as other representations of the data item, but less likely to be the same as still other representations of the data item. Therefore, the sub-query for eliciting a particular representation can be considered as having rankings for all the representations of the data item, each of which correspond to the likelihood that successful evaluation of the sub-query results in obtaining a different representation. The highest ranking of the sub-query is for the representation that the sub-query specifically elicits. The lowest ranking is for the representation that the sub-query is least likely to elicit.

An example is informative in this respect. Consider the birth date of a person of the node 106 of the data graph of FIG. 1, specifically the representation as to what the person him or herself considered as his or her birth date. This is the representation of the birth date stored in the node 106. There is a sub-query that elicits this representation, and which has the highest ranking, such as five. For the remainder of this example, this sub-query is referred to as the given sub-query.

Another representation of the date of birth of the person is stored in the node 108, and corresponds to the date of the actual birth of the person at the hospital. The likelihood that this date is also the date that the person him or herself considers as his or her birth date is very high. Therefore, for this representation, the given sub-query (i.e., the sub-query corresponding to the representation of the birth date as stored within the node 106 itself) may have the next highest ranking, such as four.

Two other representations of the date of birth of the person are stored in the nodes 102 and 104. The former representation is the date of the person for tax purposes, whereas the latter representation is the medical date of birth of the person. The likelihood that the former date is the date that the person him or herself considers as his or her birth date is low, whereas the likelihood that the latter date is the date that the person him or herself considered as his or her birth date is very high. Therefore, for the former representation, the given sub-query may have a low ranking, such as two, but for the latter representation, the given sub-query may again have the next highest ranking, such as four.

The edges 114 and 116 also store representations of the date of the person, with the former edge storing the date for inheritance purposes, and the latter edge storing the date when the birth more left the hospital after giving birth. The likelihood that the former date is the date that the person him or herself considers as his or her birthdate is low, and the likelihood that the latter date is the date that the person him or herself considered as his or her birth is very low. Therefore, for the former representation, the given sub-query may have a low ranking, such as two, and for the latter representation, the ranking of the given sub-query is even lower, such as one.

Finally, the edges 124 and 126 store representations of the date of the person, too. The former edge stores the date when the doctor was first called to the delivery room, and the latter edge stores the date when the nurse was first called to the delivery room. The likelihood that these dates are the same as the date that the person him or herself considers as his or her birth date may be neither high nor low in the former instance, and low in the latter instance. Therefore, for the former representation, the given sub-query may have a ranking of three, and for the latter representation, the given sub-query may have a ranking of two.

Thus, each sub-query has rankings for all the representations of a data item, where the highest ranking can be reserved for the representation to which the sub-query actually corresponds. The rankings can be manually assigned by a data architect when a data graph is created, or as new data is added to the data graph (with new representations and/or new data item types created). The rankings can be determined in other ways as well. For example, statistical analysis can be performed among the various representations of the data items of the same type to determine the likelihood that each pair of two representations is the same. Other types of analyses can include conducting surveys of users, and so on.

In the method 500, the computing device determines a selected sub-query that best corresponds to the query in question (502). That is, the computing device determines a selected sub-query that evaluation of which will most likely yield the appropriate representation of the data item for the query. For the method 500, the computing device determines one such sub-query.

For example, if the query is for the date of birth of a person for tax purposes, then the sub-query corresponding to the representation stored in the node 102 of the data graph 100 of FIG. 1 is definitively selected. As another example, if the query is for when a person was actually born, then the sub-query corresponding to the representation stored in the node 104—which is the actual medical date of birth—may be selected. However, in this case, the representation stored in the node 108, which is the date of the birth as recorded at the hospital, may be equally valid. When there are multiple representations that may best correspond to a query, one of the representations may be randomly chosen to determine the selected sub-query, or other data may be employed to make a decision. For instance, the data source from which the data of the node 104 was imported may have been determined as being less accurate than that from which the data of the node 108 was imported, such that the sub-query for the representation of the node 108 may be selected over that for the representation of the node 104 if both are otherwise equally appropriate for the query.

In general, determining a selected sub-query thus involves matching the information requested by the query with the different representations of the data item. For very particular queries that align with the different representations, such matching will definitively result in the determination of a selected sub-query. A query asking for the birth date of a person for tax purposes, inheritance purposes, and so on, definitively matches sub-queries when there are representations of birth date for tax purposes and inheritance purposes. If a one-to-one matching is not possible, due to, for example, the imprecision of the query, however, statistical modeling and other techniques may be employed to determine the selected sub-query. As one example, if a one-to-one matching is not possible and if the query just asks for the data item without qualifiers (i.e., asking for the date of birth of a person without specifying any further for what purpose), then a preassigned sub-query may be selected.

The computing device then orders the sub-queries by their rankings for the representation to which the selected sub-query corresponds (504). The first sub-query is that which has the highest ranking, and is the selected sub-query itself. The other sub-queries are then ordered behind the selected sub-query, according to their rankings for the representation to which the selected sub-query corresponds.

For example, consider the query as to when a person considers his or her date of birth. The selected sub-query for this query in the data graph 100 of FIG. 1 is for the representation of the node 106. This sub-query has the highest ranking, five, for this representation, per the example noted above. The sub-queries having the next highest ranking, four, are those for the representations of the nodes 104 and 108. The sub-query having the third highest ranking, three, is for the representation of the edge 124. The sub-queries having the second lowest ranking, two, are for the representations of the node 102 and of the edges 114 and 126. The sub-query having the lowest ranking, one, is for the representation of the edge 116. As such, the sub-queries have been ordered.

The method 500 is particularly appropriate for ordering the sub-queries for a query when the query was input by a user in such a way that the specific representation of the data item sought is clearly identifiable. For instance, the user may be requested to select a data item type, as well as a particular representation for a data item of this type. In this case, the selected sub-query can be confidently determined as that for the user-selected representation. However, for other types of queries, such as freeform queries entered in a natural language manner, it may be more difficult to confidently select a sub-query in the method 500.

Figure 6:
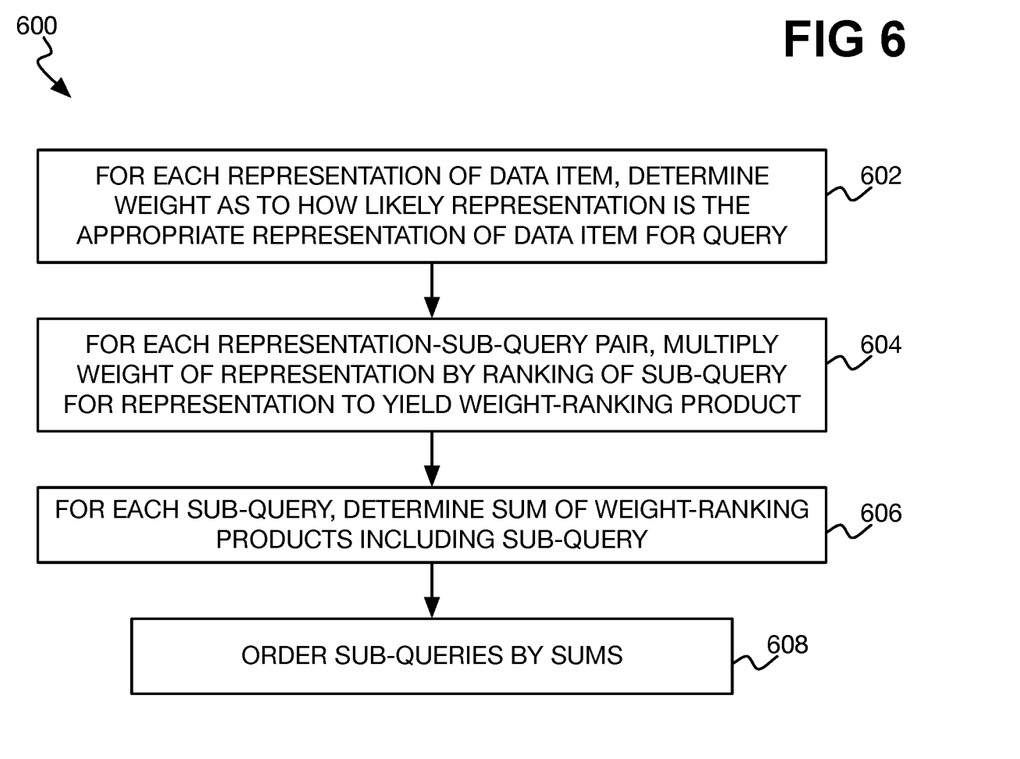

FIG. 6 thus shows an example method 600 that provides another approach for ordering the sub-queries for a query. The method 600 can, like the method 500, implement part 206 of the method 200. The computing device that performs the method 200 therefore can perform the method 600 as well.

The computing device determines, for each representation of a data item that is the subject of a query, a weight as to how likely the representation is the appropriate representation of this data item (602). Part 602 of the method 600 can be considered as accommodating the ambiguity that may be present in choosing a selected sub-query in part 502 of the method 500. Weighting each representation as to whether it is the representation of the data item that best answers the query, or is the correct answer for the query, can be performed in a number of different ways.

Most generally, machine learning or another technique can be employed to analyze a natural language, freeform query against the available representations of a data item to weight each representation by the likelihood that it is the most appropriate representation for the query. Natural language processing techniques, for instance, may be used to determine the meaning of a natural language, freeform query, and then the meaning mapped to the representations of a data item to determine the weights as to the likelihood that the representations are the answer that the query is seeking. A first representation having a higher weight than a second representation means that the first representation is more likely to be the appropriate representation of the data item for the query than the second representation. The result of part 602, then, is a weight assigned to each representation of the data item.

As described above in relation to the method 500, each sub-query has a ranking for each representation. For each unique pair of a sub-query and a representation, the computing device multiplies the weight assigned to that representation for the query in part 602 by the ranking that the sub-query has for the representation (604), which yields a weight-ranking product for each sub-query-representation pair. For example, if there are representations A, B, C, D of a data item, then there are corresponding sub-queries a, b, c, d for these data items. For a query, each representation A, B, C, D of the data item has a corresponding weight wA, wB, wC, wD. Sub-query a has rankings raA, raB, raC, raD for the representations A, B, C, D; sub-query b has rankings rbA, rbB, rbC, rbD for the representations A, B, C, D; sub-query c has rankings rcA, rcB, rcC, rcD for the representations A, B, C, D; and sub-query d has rankings rdA, rdB, rdC, rdD for the representations A, B, C, D.

Therefore, for the pairs including the representation A and the sub-queries a, b, c, and d there are products wA*raA, wA*rbA, wA*rcA, and wA*rdA, respectively. For the pairs including the representation B and the sub-queries a, b, c, and d there are products wB*raB, wB*rbB, wB*rcB, and wB*rdB, respectively. For the pairs including the representation C and the sub-queries a, b, c, and d there are products wC*raC, wC*rbC, wC*rcC, and wC*rdC, respectively. For the pairs including the representation D and the sub-queries a, b, c, and d there are products wD*raD, wD*rbD, wD*rcD, and wD*rdD, respectively.

For each sub-query, the computing device then adds the weight-ranking products that include the rankings of the sub-query, to yield a sub-query sum (606). In the example of the prior paragraph, the sub-query a has sum equal to wA*raA plus wB*raB plus wC*raC plus wD*raD. The sub-query b has a sum of wA*rbA, wB*rbB, wC*rbC, and wD*rbD. The sub-query c has a sum of wA*rcA, wB*rcB, wC*rcC, and wD*rcD. The sub-query d has a sum of wA*rdA, wB*rdB, wC*rdC, and wD*rdD.

The computing device orders the sub-queries by their sums (608). It is noted that the method 500 is a special case of the method 600, in which one representation has a weight of one—to which the selected sub-query of part 502 corresponds—and the other representations have weights of zero. For instance, in the example that has been described, if the representation A has a weight of one and the representations B, C, and D each have a weight of zero, the resulting sums for the sub-queries a, b, c, and d are equal to raA, rbA, rcA, and rdA, respectively. Such sums are simply the rankings of the sub-queries for the representation A, such that part 608 of the method 600 effectively reduces to part 504 of the method 500.

Figure 7:
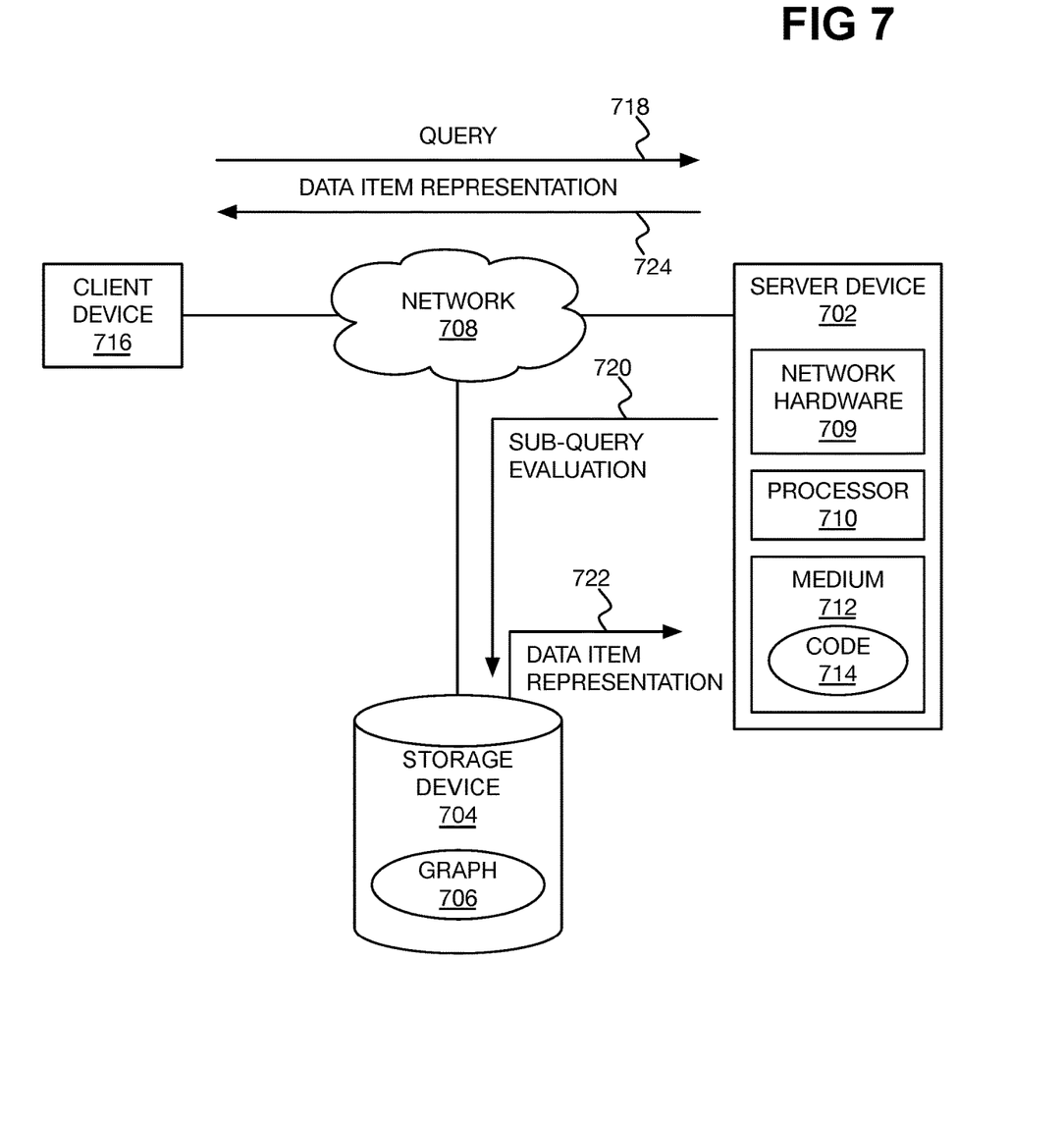
FIG. 7 is a diagram of an example system.

FIG. 7 shows an example system 700. The system 700 can include a server computing device 702 and a storage device 704 that stores a data graph 706, such as the data graph 100 that has been described. As depicted in the example of FIG. 7, the server computing device 702 and the storage device 704 are communicatively connected to on another over a network 708. However, in another implementation, the storage device 704 may be part of or directly connected to the server computing device 702.

The server computing device 702 includes network hardware 709, a processor 710, and a computer-readable medium 712 that stores computer-executable code 714. The network hardware 709 can include an Ethernet adapter, or another type of network adapter. The network hardware 709 permits the server computing device 702 to communicatively connect to the network 708, to which the storage device 704 is also communicatively connected in the example of FIG. 7. The computer-readable medium 712 may be or include a volatile or non-volatile medium. The processor 710 executes the code 714 from the medium to perform any of the methods that have been described.

The storage device 704 can be or include a non-volatile storage device, and may be part of a SAN or another type of storage system or sub-system. The network 708 may be or include a local-area network (LAN), a wide-area network (WAN), an intranet, an extranet, the Internet, as well as other types of networks. A client computing device 716 can also be communicatively connected to the network 708. The client computing device 716 may be a general-purpose computer, such as a desktop or laptop computer, and/or a mobile computing device, such as a smartphone, a tablet computing device, and so on.

In operation, the server computing device 702 receives a query for a data item of the data graph 706 from the client computing device 716, per arrow 718. The server computing device 702 responsively determines sub-queries for this query, and evaluates one or more sub-queries against the data graph 706 of the storage device 704, per arrow 720. In response, the server computing device 702 can receive a representation of the data item appropriate to the query, per arrow 722. The server computing device 702 then returns this representation of the data item to the client computing device 716, per arrow 724. The data and processing flow represented by the arrows 718, 720, 722, and 724 thus represent the data and processing that flows and occurs among the devices 702, 704, and 706 over the network 708 in realizing the method 200 of FIG. 2.

The techniques that have been described herein provide for a high performance manner by which a query for a data item that has multiple representations in a data graph to be evaluated. Specifically, sub-queries for the query are evaluated on a sub-query by sub-query basis until one of the sub-queries results in successful evaluation in the form of a corresponding representation of the data item within the graph. Once evaluation of a sub-query returns a representation of the data item, no other sub-queries are evaluated, but rather the query is considered as having been successfully fulfilled. By ordering the sub-queries according to their likelihood that their corresponding representations are the appropriate representation of the data item for the submitted query, the potential that when the query has been fulfilled any unevaluated sub-query would have provided a more appropriate representation is minimized.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, by a computing device, a query for retrieving a data item of a data graph, the data graph storing a plurality of representations of the data item, each representation of the data item storing knowledge represented by the data item in a different manner;
determining, by the computing device, a plurality of sub-queries for the query, each sub-query corresponding to a different representation by which the data graph stores the data item, wherein each sub-query of the plurality of sub-queries is modified from a general sub-query, wherein each general sub-query corresponds to each new representation of the data item and is determined for the new representation of the data item each time the new representation of the data item is added to the data graph; and
ordering, by the computing device, the sub-queries for the query according to likelihoods that evaluation of the sub-queries will yield an appropriate representation of the data item for the query.

2. The method of claim 1, further comprising:
evaluating, by the computing device, the sub-queries as ordered on a sub-query by sub-query basis, until the data item has been retrieved; and
returning, by the computing device, the data item as has been retrieved.

3. The method of claim 1, wherein once the data item has been retrieved by evaluating one of the sub-queries, any other sub-queries that have not yet been evaluated are not evaluated.

4. The method of claim 1, wherein ordering the sub-queries yields a list of the sub-queries from a first sub-query having a highest likelihood of yielding the appropriate representation of the data item for the query to a last sub-query having a lowest likelihood of yielding the appropriate representation of the data item for the query, and wherein evaluating the sub-queries comprises:
setting a current sub-query to the first sub-query of the list;
evaluating the current sub-query to attempt to retrieve the representation of the data item to which the current sub-query corresponds; and
if evaluation of the current sub-query does not retrieve the data item and if the current sub-query is not the last sub-query of the list, setting the current sub-query to a next sub-query of the list and again evaluating the current sub-query.

5. The method of claim 4, wherein evaluating the sub-queries further comprises:
if evaluation of the current sub-query does not retrieve the data item and if the current sub-query is the last sub-query of the list, reporting that the query cannot be successfully evaluated against the data graph.

6. The method of claim 1, wherein ordering the sub-queries for the query comprises:
for each sub-query, determining the likelihood that evaluation of the sub-query will yield the appropriate representation of the data item for the query.

7. The method of claim 1, wherein each sub-query has a ranking for each representation of the data item as to how likely evaluation of the sub-query will yield the representation of the data item, and wherein ordering the sub-queries for the query comprises:
determining a selected sub-query that evaluation of which will most likely yield the appropriate representation of the data item for the query; and ordering the sub-queries by the rankings thereof for the representation of the data item to which the selected sub-query corresponds.

8. The method of claim 1, wherein each sub-query has a ranking for each representation of the data item as to how likely evaluation of the sub-query will yield the representation of the data item, and wherein ordering the sub-queries for the query comprises:
   determining, for each representation of the data item, a weight as to how likely the representation is the appropriate representation of the data item for the query;
   for each pair of one of the representations and one of the sub-queries, multiplying the weight of the representation of the pair by the ranking of the sub-query of the pair for the representation of the pair, to yield a weight-ranking product;
   for each sub-query, adding together the weight-ranking products that include the ranking of the sub-query to yield a sub-query sum; and
   ordering the sub-queries by the sub-query sums thereof.

9. The method of claim 1, wherein determining the sub-queries for the query comprises:
   determining a type of the data item to which the query corresponds;
   retrieving a plurality of general sub-queries that have been previously generated for the type of the data item to which the query corresponds; and
   modifying the general sub-queries based on the query to generate the sub-queries for the query.

10. The method of claim 1, wherein determining the sub-queries for the query comprises:
    determining a type of the data item to which the query corresponds;
    determining a plurality of representations as to how data items of the type are stored within the data graph;
    dynamically generating a plurality of general sub-queries for the representations as to how the data items of the type are stored within the data graph; and
    modifying the general sub-queries based on the query to generate the sub-queries for the query.

11. A computer program product comprising a computer-readable storage medium having program instructions embodied therewith, wherein the computer-readable storage medium is not a transitory signal per se, the program instructions executed by a computing device to:
    order a plurality of sub-queries for a query, the query for retrieving a data item of a data graph, the data graph storing a plurality of representations of the data item, each representation storing information represented by the data item in a different way, each sub-query corresponding to a different representation in which the data graph stores the data item, wherein each sub-query of the plurality of sub-queries is modified from a general sub-query, wherein each general sub-query corresponds to each new representation of the data item and is determined for the new representation of the data item each time the new representation of the data item is added to the data graph, the sub-queries ordered in an ordered list according to likelihood that evaluation thereof will yield a selected representation of the data item that is correct for the query; and
    evaluate the sub-queries within the ordered list on a sub-query by sub-query basis, until the data item has been retrieved.

12. The computer program product of claim 11, wherein at least one of the sub-queries is not evaluated.

13. The computer program product of claim 11, wherein the computing device is to evaluate the sub-queries by:
    setting a current sub-query to a first sub-query of the list;
    evaluating the current sub-query to attempt to retrieve the representation of the data item to which the current sub-query corresponds;
    if evaluation of the current sub-query does not retrieve the data item and if the current sub-query is not a last sub-query of the list, setting the current sub-query to a next sub-query of the list and again evaluating the current sub-query; and
    if evaluation of the current sub-query does not retrieve the data item and if the current sub-query is the last sub-query of the list, reporting that the query cannot be successfully evaluated against the data graph.

14. The computer program product of claim 11, wherein each sub-query has a ranking for each representation of the data item as to how likely evaluation of the sub-query will yield the representation of the data item, and wherein the computing device is to order the sub-queries by:
    determining a selected sub-query that evaluation of which will most likely yield the selected representation of the data item; and
    ordering the sub-queries by the rankings thereof for the representation of the data item to which the selected sub-query corresponds.

15. The computer program product of claim 11, wherein program instructions are executed by the computing device to further:
    determine a type of the data item to which the query corresponds;
    retrieve a plurality of general sub-queries that have been previously generated for the type of the data item to which the query corresponds; and
    modify the general sub-queries based on the query to generate the sub-queries for the query.

16. A system comprising:
    network hardware to communicatively connect to a network over which a query for retrieving a data item of a data graph is received;
    a storage device to store the data graph, the data graph including a plurality of representations of the data item, each representation representing the data item in a different way; and
    logic comprising hardware, to:
      order a plurality of sub-queries for the query in an ordered list according to how likely evaluation thereof yields a selected representation of the data item that correctly answers the query, wherein each sub-query of the plurality of sub-queries is modified from a general sub-query, wherein each general sub-query corresponds to each new representation of the data item and is determined for the new representation of the data item each time the new representation of the data item is added to the data graph; and
      evaluate the sub-queries within the ordered list on a sub-query by sub-query basis, until the data item has been retrieved or until all the sub-queries have been evaluated and the data item has not been retrieved.

17. The system of claim 16, wherein after the logic has retrieved data item, the logic does not evaluate any other sub-queries that have not yet been evaluated are not evaluated.

18. The system of claim 16, wherein the logic is to evaluate the sub-queries by:

setting a current sub-query to a first sub-query of the list;

evaluating the current sub-query to attempt to retrieve the representation of the data item to which the current sub-query corresponds;

if evaluation of the current sub-query does not retrieve the data item and if the current sub-query is not a last sub-query of the list, setting the current sub-query to a next sub-query of the list and again evaluating the current sub-query; and if evaluation of the current sub-query does not retrieve the data item and if the current sub-query is the last sub-query of the list, reporting that the query cannot be successfully evaluated against the data graph.

19. The system of claim 16, wherein each sub-query has a ranking for each representation of the data item as to how likely evaluation of the sub-query will yield the representation of the data item, and wherein the logic is to order the sub-queries for the query by:

determining, for each representation of the data item, a weight as to how likely the representation is the selected representation of the data item;

for each pair of one of the representations and one of the sub-queries, multiplying the weight of the representation of the pair by the ranking of the sub-query of the pair for the representation of the pair, to yield a weight-ranking product;

for each sub-query, determining a sub-query sum of the weight-ranking products that include the ranking of the sub-query; and ordering the sub-queries by the sub-query sums thereof.

20. The system of claim 16, wherein the logic is further to:

determine a type of the data item to which the query corresponds;

determine a plurality of representations as to how data items of the type are stored within the data graph;

dynamically generate a plurality of general sub-queries for the representations as to how the data items of the type are stored within the data graph; and modify the general sub-queries based on the query to generate the sub-queries for the query.

* * * * *